(12) United States Patent
Yoshida et al.

(10) Patent No.: US 7,625,194 B2
(45) Date of Patent: Dec. 1, 2009

(54) UNIT FOR PRODUCTION OF TUBULAR RESIN FILM

(75) Inventors: Shingo Yoshida, Kobe (JP); Seigou Akazawa, Kobe (JP); Keiko Akazawa, legal representative, Kobe (JP); Toyotaro Maruyama, Kobe (JP); Takeshi Takeuchi, Kobe (JP); Shigeyoshi Furuhara, Kawasaki (JP); Masanori Ikenaga, Kobe (JP); Toshio Nakao, Yokohama (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 0 days.

(21) Appl. No.: 10/543,612

(22) PCT Filed: Dec. 24, 2003

(86) PCT No.: PCT/JP03/16534

§ 371 (c)(1),
(2), (4) Date: Apr. 21, 2006

(87) PCT Pub. No.: WO2004/067266

PCT Pub. Date: Aug. 12, 2004

(65) Prior Publication Data

US 2006/0269642 A1    Nov. 30, 2006

(30) Foreign Application Priority Data

| Jan. 31, 2003 | (JP) | ............... 2003-023208 |
| Jan. 31, 2003 | (JP) | ............... 2003-024899 |
| Feb. 27, 2003 | (JP) | ............... 2003-050815 |
| Mar. 28, 2003 | (JP) | ............... 2003-090375 |
| Sep. 24, 2003 | (JP) | ............... 2003-331555 |

(51) Int. Cl.
*B29C 47/90* (2006.01)

(52) U.S. Cl. .............. 425/66; 264/565; 264/209.5; 264/290.2; 425/72.1; 425/325; 425/326.1; 425/387.1; 425/384; 425/393

(58) Field of Classification Search .............. 425/66, 425/72.1, 325, 326.1, 387.1, 384, 393; 264/209.5, 264/290.2, 565
See application file for complete search history.

(56) References Cited

U.S. PATENT DOCUMENTS 2,987,765 A * 6/1961 Cichelli .............. 264/565

(Continued)

FOREIGN PATENT DOCUMENTS

JP    50-56453    5/1975

(Continued)

OTHER PUBLICATIONS

U.S. Appl. No. 10/543,610 to Takeuchi et al.

(Continued)

*Primary Examiner*—Robert B Davis
*Assistant Examiner*—Joseph Leyson
(74) *Attorney, Agent, or Firm*—Smith, Gambrell & Russell, LLP

(57) ABSTRACT

A manufacturing apparatus is provided for manufacturing a tubular resin film of high quality and little thickness variations, which is stretched and given an orientation, and suitable as retardation film or the like. It comprises a stretching section (6) for stretching the tubular resin film (20), and a maintaining section (7) for maintaining a shape of said tubular resin film (20) stretched. Further, said stretching section (6) is arranged to apply a stretching force to said tubular resin film for longitudinally and/or circumferentially stretching said tubular resin film (20).

13 Claims, 9 Drawing Sheets

U.S. PATENT DOCUMENTS

| | | | | |
|---|---|---|---|---|
| 2,987,767 | A * | 6/1961 | Berry et al. | 264/565 |
| 3,246,061 | A * | 4/1966 | Blatz | 264/565 |
| 3,412,189 | A * | 11/1968 | Sullivan | 264/565 |
| 3,608,019 | A * | 9/1971 | Sato et al. | 264/565 |
| 3,678,545 | A * | 7/1972 | Hino et al. | 26/85 |
| 3,716,320 | A * | 2/1973 | Lyon | 425/326.1 |
| 3,742,105 | A * | 6/1973 | Kuroda | 264/565 |
| 3,936,265 | A * | 2/1976 | McDevitt | 425/326.1 |
| 3,976,733 | A * | 8/1976 | Havens | 425/326.1 |
| 4,251,197 | A * | 2/1981 | Sudo | 425/393 |
| 4,525,414 | A | 6/1985 | Ohya et al. | |
| 5,096,634 | A | 3/1992 | Tsadares et al. | |
| 5,942,171 | A * | 8/1999 | Prenger | 264/209.5 |
| 5,948,332 | A * | 9/1999 | Prenger | 425/325 |
| 6,214,283 | B1 * | 4/2001 | Visscher et al. | 425/326.1 |
| 6,368,547 | B1 * | 4/2002 | Visscher | 425/326.1 |
| 6,478,992 | B1 | 11/2002 | Suzuki | |
| 2002/0084542 | A1 | 7/2002 | Suzuki | |
| 2008/0099949 | A1 * | 5/2008 | Takeuchi et al. | 264/150 |

FOREIGN PATENT DOCUMENTS

| | | |
|---|---|---|
| JP | 2-8583 | 2/1990 |
| JP | 5-449 | 1/1993 |
| JP | 11-10713 | 1/1999 |
| JP | 2000-263629 | 9/2000 |
| JP | 2001-96607 | 4/2001 |

OTHER PUBLICATIONS

Office Action issued by Chinese Patent Office, dated Sep. 29, 2006.

* cited by examiner (a)

(b)

UNIT FOR PRODUCTION OF TUBULAR RESIN FILM

TECHNICAL FIELD

This invention relates to a manufacturing apparatus and manufacturing method for tubular resin film using a thermoplastic resin as raw material. More particularly, this invention relates to a manufacturing apparatus and manufacturing method for tubular resin film with a small thickness and uniform and smooth surfaces, and usable as retardation film, shrink film, laminate film and so on.

BACKGROUND ART

Numerous research and development efforts have so far been made on thermoplastic resin film by many researchers, enterprises and the like. Thermoplastic resin film, although its raw material is relatively inexpensive, is excellent in mechanical property, chemical resistance, transparency, water vapor permeability and so on, and is therefore used in variety fields such as packaging, general merchandise, agriculture, industry, food, and medical care.

In recent years, there have appeared many examples of using thermoplastic resin film in the optical field. Thermoplastic resins (e.g. polycarbonate and cyclic polyolefin) have a relatively good light transmittance, and may be given optical anisotropy (orientation) by stretching treatment (uniaxial stretching or biaxial stretching). Film produced from such thermoplastic resin given an orientation property may be conveniently used as retardation film for liquid crystal displays (LCDs) and the like.

Various methods of manufacturing such thermoplastic resin film are known and have been implemented. The thermoplastic resin film manufacturing methods generally used in industry include a solvent casting method that forms film by casting, to the glass plate or the like, a resin solution having a resin dissolved in a solvent (see Patent Application "Kokai" No. 5-239229, for example), a T-die extrusion method that forms film by cooling with a chill roll a melted resin extruded from an extruder (see Patent Application "Kokai" No. 2000-219752, for example), a tubular extrusion method that extrudes a melted resin in a tubular form from an extruder (see Patent Application "Kokai" No. 59-120428, for example), and a blown film extrusion method that shapes a resin while applying an air pressure inside the resin extruded in a tubular form (see Patent Applications "Kokai" No. 60-259430 and No. 8-267571, for example).

However, the conventional thermoplastic resin film manufacturing methods noted above have various problems. The solvent casting method, for example, has a drawback of requiring a large apparatus as a whole since a solvent is used, and this results in an increased manufacturing cost. As a more serious problem, the solvent casting method uses a large quantity of solvent, imposing a great load on environment, which is against today's current of environmental protection.

The T-die extrusion method also has a problem of requiring a large apparatus which needs a large installation area, and moreover, the apparatus itself is very expensive. A further problem of the T-die extrusion method is that, when an attempt is made to reduce film thickness, the thickness accuracy of film ends will become low, and the film ends must be discarded. This results in a reduced product yield.

Generally, the film produced by the T-die extrusion method is stretched in a tentering mode. In the tentering mode, end regions of the film are pinched with clips. Thus, only the film central part could be used because of large variations in the slow axis angle in the end regions.

On the other hand, the tubular extrusion method allows equipment to be relatively small, and its product yield is also good. Thus, this method is more widely used in the field of resin film molding than before. The tubular extrusion method can obtain resin film in a tubular shape, and this tubular resin film may be cut open in the longitudinal direction with a cutting device such as a roll cutter, to obtain a broad resin film. With such conventional tubular extrusion method, however, it has been very difficult to obtain resin film of fixed quality on a regular basis. A resin extruded in a tubular form from an extruder is unstable and vulnerable to the influence of outside environment, and its shape can change easily. With the tubular extrusion method, therefore, it has been almost impossible to manufacture steadily resin film products usable as retardation film or the like, having a small and uniform film thickness, and having smooth surfaces.

The blown film extrusion method is a method that, after extruding a melted resin in a tubular form from an extruder, shapes the resin film while blowing air inside the resin. With this method, as with the above-noted methods, the instability of the resin extruded in a tubular form from the extruder readily results in creases, slacks, lenticulations and the like on the film due to minor changes in film tension and turbulences of air currents. Thus, with the blown film extrusion method also, the problem remains to be solved that it is difficult to manufacture steadily resin film products having a small and uniform film thickness, and having smooth surfaces.

The film produced by the conventional tubular extrusion method or blown film extrusion method has large thickness variations, and could not be used conveniently as retardation film or the like.

Therefore, this invention has been made having regard to the problems noted above, and its object is to provide a manufacturing apparatus for manufacturing a tubular resin film of high quality and little thickness variations, which is stretched and given an orientation, and suitable as retardation film or the like.

DISCLOSURE OF THE INVENTION

A tubular resin film manufacturing apparatus according to this invention comprises a stretching section for stretching a tubular resin film, and a maintaining section for maintaining a shape of said tubular resin film stretched.

With the tubular resin film manufacturing apparatus having this construction, the stretching section stretches the tubular resin film, and then the maintaining section maintaining the stretched shape of the tubular resin film stretched. Thus, there is no possibility of contraction of the tubular resin film often seen after stretching. Such a tubular resin film may be made a resin film product of high quality free from creases, slacks, lenticulations and the like, and little thickness variations and retardation variations.

In the tubular resin film manufacturing apparatus according to this invention, said stretching section may be arranged to apply a stretching force to said tubular resin film for longitudinally stretching said tubular resin film.

With this construction, the tubular resin film may be stretched to apply an orientation longitudinally of the film, thereby to manufacture a tubular resin film suitable as a retardation film to be used for liquid crystal displays (LCDs) and the like. Such a tubular resin film may be made a resin film product of high quality free from creases, slacks, lenticulations and the like, and little thickness variations and retardation variations.

In the tubular resin film manufacturing apparatus according to this invention, said stretching section may be arranged to apply a stretching force to said tubular resin film for circumferentially stretching said tubular resin film.

With this construction, the tubular resin film may be stretched to apply an orientation circumferentially of the film, thereby to manufacture a tubular resin film suitable as a retardation film to be used for liquid crystal displays (LCDs) and the like. Such a tubular resin film may be made a resin film product of high quality free from creases, slacks, lenticulations and the like, and little thickness variations and retardation variations.

In the tubular resin film manufacturing apparatus according to this invention, said stretching section may include a mandrel formed of a porous material.

Where, as in this construction, the mandrel of the stretching section is formed of a porous material, gas may be exuded uniformly from the entire surface thereof, with little local variations in the amount of gas exudation. Consequently, the non-contact between the tubular resin film and the stretching section is further promoted, thereby minimizing the possibility of leaving scratches and line patterns on the inner surface of the film. Such a tubular resin film may be made a resin film product of high quality free from creases, slacks, lenticulations and the like, and little thickness variations. The improved non-contact between the tubular resin film and the stretching section reduces resistance in time of stretch, thereby performing the stretching process in the stretching section smoothly.

In the tubular resin film manufacturing apparatus according to this invention, said stretching section may comprise a split type diameter enlarging mandrel dividable into a plurality of parts, each of said parts being radially movable.

Where, as in this construction, the stretching section comprises a split type diameter enlarging mandrel, it is possible to produce the tubular resin film having various draw ratios with the single mandrel. The split type diameter enlarging mandrel can be moved not only in time of an off-line state not working on the tubular resin film, but also during a stretching process. This allows a fine adjustment of film manufacturing conditions to be made during operation. As a result, the tubular resin film of this invention can be made a high-quality resin film product.

In the tubular resin film manufacturing apparatus according to this invention, said maintaining section may be formed of a porous material.

Where, as in this construction, the maintaining section is formed of a porous material, gas may be exuded uniformly from the entire surface thereof, with little local variations in the amount of gas exudation. Consequently, the non-contact between the tubular resin film and the maintaining section is further promoted, thereby minimizing the possibility of leaving scratches and line patterns on the inner surface of the film. Such a tubular resin film may be made a resin film product of high quality free from creases, slacks, lenticulations and the like, and little thickness variations.

In the tubular resin film manufacturing apparatus according to this invention, said maintaining section may be arranged to cool the tubular resin film.

With this construction, the tubular resin film is stretched in the stretching section, and subsequently the stretched shape of the film is retained and fixed while being cooled in the maintaining section. Thus, there is no possibility of contraction of the tubular resin film often seen after stretching. Such a tubular resin film may be made a resin film product of high quality free from creases, slacks, lenticulations and the like, and little thickness variations and retardation variations.

The tubular resin film manufacturing apparatus according to this invention may comprise a venting device for preventing an increase of a tube internal pressure of said tubular resin film.

With this construction, the venting device can adjust pressures inside and outside the tubular resin film, so that the tubular resin film may not expand outward, or repeat contraction and expansion, thereby maintaining excellent smoothness of the film. Such a tubular resin film may be made a resin film product of high quality free from creases, slacks, lenticulations and the like, and little thickness variations and retardation variations.

The tubular resin film manufacturing apparatus according to this invention may comprise a preheating section for preheating said tubular resin film before being stretched.

With this construction, the preheating section heats the tubular resin film beforehand. Since preheating temperature is changeable, the stretching section can stretch the tubular resin film in a suitable temperature range. Such a tubular resin film may be made a resin film product of high quality free from creases, slacks, lenticulations and the like, and little thickness variations and retardation variations.

BEST MODE FOR CARRYING OUT THE INVENTION

Embodiments of this invention will be described hereinafter with reference to the drawings. It should be noted that this invention is not limited to the constructions described in the following embodiments and drawings.

Figure 1:
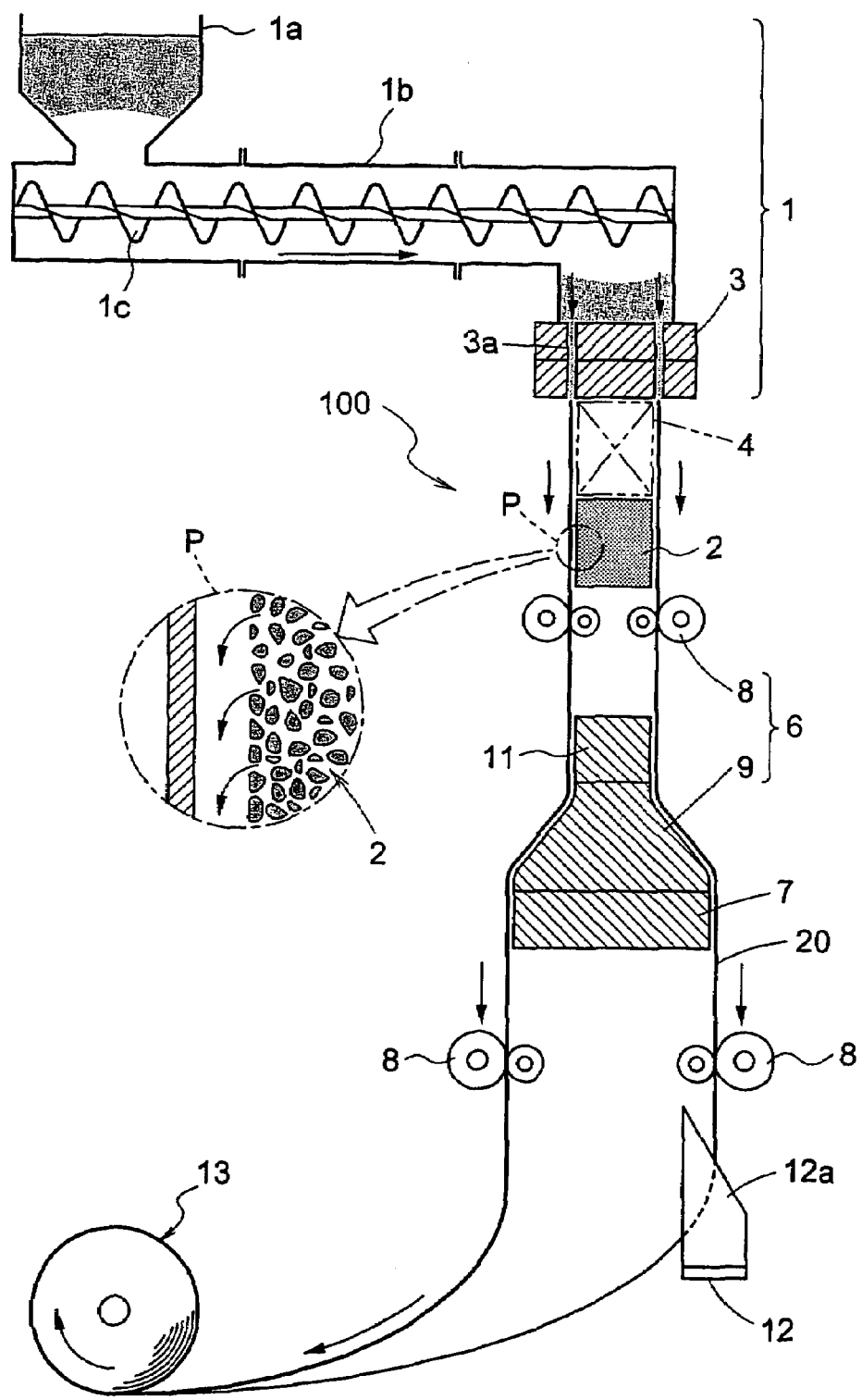
FIG. 1 is a schematic view showing an example of tubular resin film manufacturing apparatus according to this invention.

FIG. 1 is a schematic view showing an example of tubular resin film manufacturing apparatus 100 according to this invention.

The tubular resin film manufacturing apparatus 100 has a heating extruder 1 and a core unit 2. A thermoplastic resin is fed into the heating extruder 1 from a hopper 1a. The thermoplastic resin fed is heated and melted as it moves inside a barrel 1b. Where the thermoplastic resin is a resin tending to be oxidized at this time, it is preferable to replace with an inert gas, or degas, the interior of the barrel 1b as necessary. The heating extruder 1, preferably, has an adjustable resin extrusion output, and may have a pressure regulating mechanism (not shown) for adjusting a molten resin extruding pressure.

The heating extruder 1 suitable for use in this invention is such that, for example, a screw 1c mounted in the barrel 1b is the full-flight uniaxial type, with an L/D ratio=20 to 30 (where L is a screw length and D is a screw diameter), and the barrel 1b is divided into three zones along the direction of movement of the thermoplastic resin, each zone being temperature-controllable.

The heating extruder 1 has a nozzle 3 for extruding the molten thermoplastic resin in a tubular form. In this specification, the nozzle 3 is an element attached in the forward end of the heating extruder 1 for extruding the thermoplastic resin directly. However, such construction is not limitative but, for example, the nozzle 3 may be integrated with the heating extruder 1. The nozzle 3 has a channel 3a having a ring-shaped section for passage of the molten resin. This channel 3a is designed so that an amount of resin extrusion per unit area is uniform over the entire ring-shaped section. The channel 3a may have a diameter of about 300 mm, for example. Where walls of the channel 3a have irregularities, scratches or the like, undesirable streak patterns will occur on the surfaces of tubular resin film formed subsequently. Thus, the channel walls should preferably be maintained as smooth as possible such as by polishing. The amount of extrusion of molten resin is variable under the influence of the temperature of the nozzle 3. It is therefore preferable to control precisely the temperature of the nozzle 3 with a temperature control device (not shown). The tubular resin film obtained by this invention may be oriented simultaneously with extrusion by adjusting the temperature of the nozzle 3 between glass transition temperature (Tg)+20° C. and glass transition temperature (Tg)+80° C. When the temperature of the nozzle 3 is lower than (Tg)+20° C., the viscosity of the resin will increase, which makes a later film-forming process difficult. When the temperature of the nozzle 3 is higher than (Tg)+80° C., on the other hand, the orientation will become difficult by relaxation of the molecules forming the resin. A more desirable range of the temperature of the nozzle 3 is from (Tg)+30° C. to glass transition temperature (Tg)+50° C.

Preferably, the nozzle 3 is designed such that, where the width of the channel 3a of the nozzle 3 is d, the relationship between the channel width d and thickness t of the extruded thermoplastic resin satisfies the following equations (1):

$$t < d < 20t \quad (1)$$

By satisfying such a condition, periodic thickness variations (draw resonance) of the film can be prevented.

Where the nozzle 3 is connected to a plurality of heating extruders so that two or more types of resin may join in the nozzle 3, it is also possible to manufacture a tubular resin film having a multilayer structure.

The core unit 2 is disposed to oppose to the inner surface of the thermoplastic resin extruded in a tubular form from the nozzle 3 of the heating extruder 1, to shape the thermoplastic resin to a tubular resin film 20. The core unit 2 is connected to a gas source (not shown) and, as shown in an enlarged circle P in FIG. 1, a gas can exude from the surface of the core unit 2 to the inner surface of the thermoplastic resin in order to reduce a friction occurring from a contact between the thermoplastic resin and the core unit 2 in time of molding. The temperature and amount of the gas exuding from the surface of the core unit 2 can be adjusted according to the type of thermoplastic resin. This may be achieved by a temperature control device and a pressure regulating device not shown. Preferably, the surface of the core unit 2 is fluorine-coated, for example, to avoid an excessive friction when it should contact the thermoplastic resin in time of molding. An upper surface (which is adjacent the heating extruder 1) of the core unit 2, preferably, is covered with a metal plate, metallic foil, metal plating treating or the like, so that the gas may not exude therefrom.

A stabilizing device 4 is disposed between the nozzle 3 of the heating extruder 1 and the core unit 2 for stabilizing the shape of the thermoplastic resin extruded in a tubular form. The thermoplastic resin immediately after being extruded in a tubular form from the nozzle 3 of the heating extruder 1 is in a state of being maintained at a temperature considerably higher than the glass transition temperature (Tg), and the thickness of which rapidly changes from that of the channel width of the nozzle to a predetermined thickness, and thus in an unstable state easily influenced by a slight change of tension, turbulence of surrounding gas flow and so on. The stabilizing device 4 functions to stabilize the shape of the thermoplastic resin in such an unstable state in a way not to obstruct the flow of the resin. Thus, the tubular resin film formed subsequently may be free from creases, slacks, lenticulations and the like, and may have a small, uniform thickness and smooth surfaces.

Thus, the stabilizing device 4 forms the most characteristic construction in this invention. In order to facilitate understanding, some examples of the stabilizing device 4 will be described below with reference to the drawings.

Figure 2:
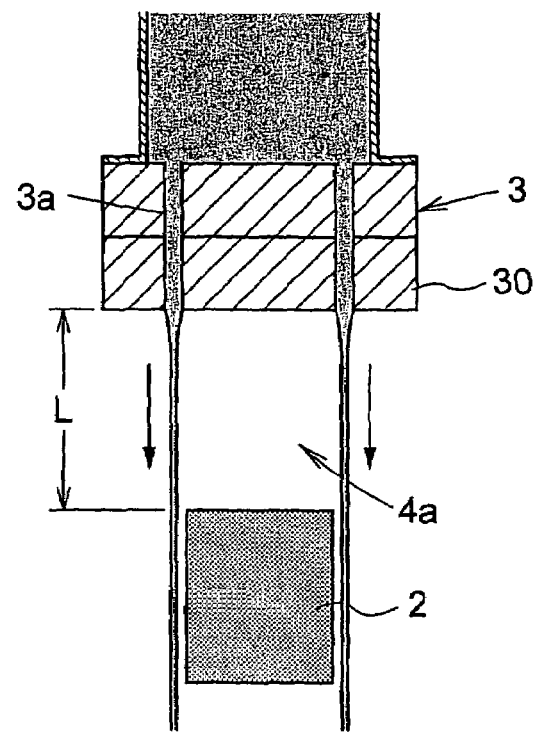
FIG. 2 is a schematic view showing an example of construction in which a stabilizing device is in the form of a spacing portion formed between a nozzle of a heating extruder and a core unit.

FIG. 2 is a schematic view showing an example of construction in which the stabilizing device is in the form of a spacing portion 4a formed between the nozzle 3 of the heating extruder 1 and the core unit 2. With this construction, the thermoplastic resin immediately after being extruded in a tubular form from the nozzle 3 of the heating extruder 1 remains at a temperature considerably higher than the glass transition temperature (Tg), as noted above. However, the spacing portion 4a prevents, for example, an external force due to a contact with a different object, and disturbances of atmosphere around the film such as non-uniform flows and temperature unevenness of the gas, from acting on the thermoplastic resin immediately after being extruded in a tubular form from the nozzle 3, thereby leading essentially unstable areas where the thickness decreases rapidly to a stabilized state. Thus, the tubular resin film formed subsequently may be free from creases, slacks, lenticulations and the like, and may have a small, uniform thickness and smooth surfaces. The size L of the spacing portion 4a shown in FIG. 2 (distance from the nozzle 3 to the core unit 2) can be set to 3 to 50 mm, for example. The thermoplastic resin with its shape stabilized is subsequently forwarded to the core unit 2, and molded to the tubular resin film 20.

Figure 3:
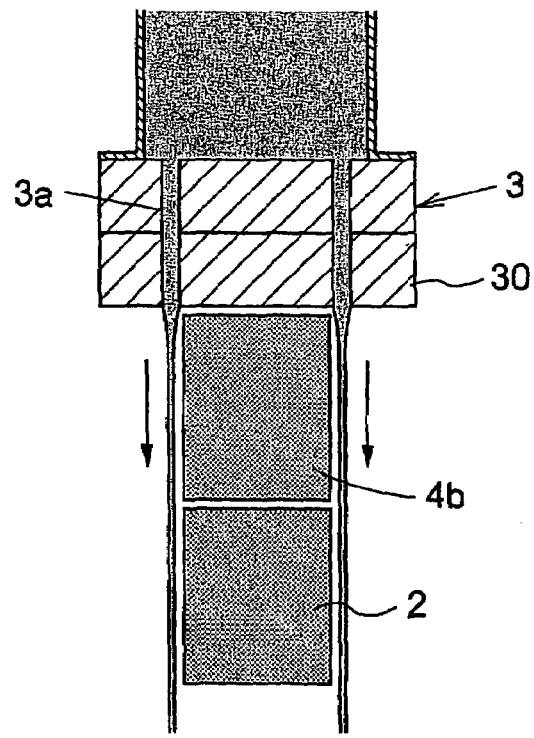
FIG. 3 is a schematic view showing an example of construction in which the stabilizing device is in the form of a second core unit for exuding a gas from its surface.

FIG. 3 is a schematic view showing an example of construction in which the stabilizing device 4 is in the form of a second core unit 4b for exuding a gas from its surface. The second core unit 4b is connected to the gas source (not shown) as is the core unit 2. The temperature and amount of the gas exuding from the surface of the second core unit 4b can be adjusted according to the type of thermoplastic resin. This may be achieved by a temperature control device and a pressure regulating device not shown. The second core unit 4b is formed so that a gas exuding state from its surface is different from the gas exudation state from the surface of the core unit 2. Specifically, the amount of gas exudation from the second core unit 4b is less than the amount of gas exudation from the core unit 2. Since the thermoplastic resin immediately after being extruded in a tubular form from the nozzle 3 of the heating extruder 1 remains at a temperature considerably higher than the glass transition temperature (Tg), an excessive amount of gas exudation from the second core unit 4b could roughen the inner surface of the thermoplastic resin, which is not desirable. With this construction, the second core unit, for example, exudes the gas more gently than the core unit to the thermoplastic resin immediately after being extruded in the tubular form from the nozzle 3, in order to maintain a non-contact state, and to realize a predetermined cooling condition while avoiding changes in the shape of the inner surface of the thermoplastic resin, thereby stabilizing the shape of the thermoplastic resin. Thus, the tubular resin film formed subsequently may be free from creases, slacks, lenticulations and the like, and may have a small, uniform thickness and smooth surfaces. The second core unit 4b may be used in combination with the spacing portion 4a described above.

FIGS. 4(a) and (b) are schematic views showing two examples the stabilizing device 4 in the form of a temperature control mechanism. In FIG. 4(a), the temperature control mechanism is in the form of a temperature control heater 4c for controlling, from inside the tube, the temperature of the thermoplastic resin extruded in the tubular form. In FIG. 4(b), the temperature control mechanism is in the form of a temperature control heater 4d for controlling, from outside the tube, the temperature of the thermoplastic resin extruded in the tubular form. The temperature control heaters 4c and 4d are operable under PID control, for example, to cool the thermoplastic resin gradually to a temperature close to Tg. With these constructions, the temperature control mechanism carries out, for example, actively a temperature control, as opposed to natural cooling, of the thermoplastic resin thereby to stabilize the shape of the thermoplastic resin. Thus, the tubular resin film formed subsequently may be free from creases, slacks, lenticulations and the like, and may have a small, uniform thickness and smooth surfaces. The temperature control mechanism may be a combination of what is shown in FIG. 4(a) and FIG. 4(b), which is a construction having the temperature control heaters arranged both inside and outside the thermoplastic resin extruded in the tubular form. Or the temperature control heater(s) may be used in combination with the spacing portion 4a and/or the second core unit 4b described hereinbefore.

Figure 5:
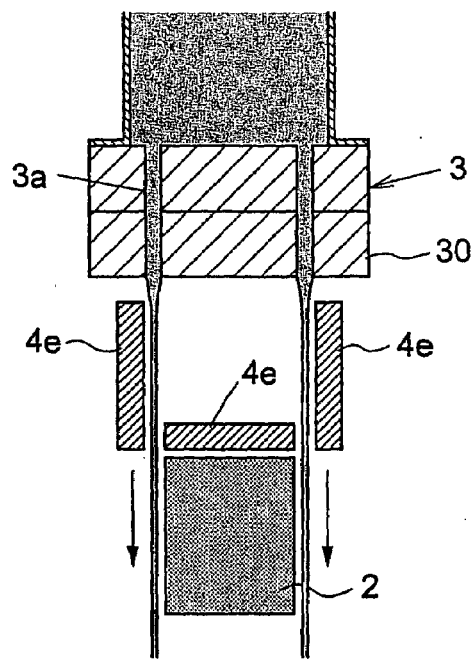
FIG. 5 is a schematic view showing an example of construction in which the stabilizing device is in the form of a gas flow preventive mechanism.

FIG. 5 is a schematic view showing an example of construction in which the stabilizing device 4 is in the form of a gas flow preventive mechanism 4e. The gas flow preventive mechanism 4e may be constructed as barrier walls, for example, that prevent gas flow blowing to the thermoplastic resin extruded in the tubular form from the nozzle 3. With this construction, the gas flow preventive mechanism 4e, for example, prevents gas flow extruding from the core unit 2 inside the tube, and gas flow outside the tube, from blowing to the thermoplastic resin extruded in the tubular form from the nozzle 3. Thus, the tubular resin film formed subsequently may be free from creases, slacks, lenticulations and the like, and may have a small, uniform thickness and smooth surfaces. The gas flow preventive mechanism 4e may be used in combination with the spacing portion 4a, the second core unit 4b and/or the temperature control mechanism described hereinbefore.

Figure 6:
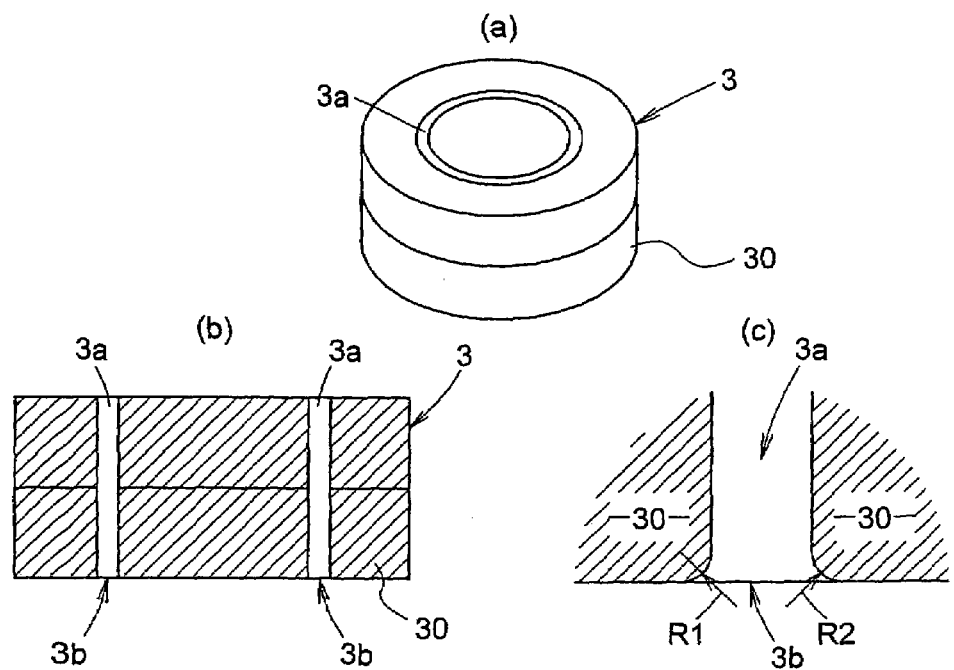
FIG. 6 shows (a) a perspective view and (b) a sectional view of the nozzle, and (c) an enlarged sectional view of an edge.

Preferably, the nozzle 3 of the heating extruder 1 has at least an edge 3b thereof formed of a superhard material. The edge 3b herein refers to a fore-end of a discharge exit of the nozzle 3 for discharging the thermoplastic resin. FIG. 6 is (a) a perspective view and (b) a sectional view of the nozzle 3, and (c) an enlarged sectional view of the edge 3b.

In order to improve peeling of the thermoplastic resin from the nozzle 3, it is usually necessary to process the edge 3b of the nozzle 3 sharply. Specifically, in FIG. 6(c), it is preferred that corner radii R1 and R2 are set to 50±5 μm or less. With this shape, the thermoplastic resin extruded from the nozzle 3 does not adhere to the edge 3b, whereby a film having flat and smooth surfaces may be produced. However, the sharper the edge 3b is shaped, the less strong the edge 3b generally becomes. This gives rise to a problem of the edge 3b being gradually worn by maintenance and the like, and in the worst case, the edge 3b being chipped. Generally, where a soft material such as iron or stainless steel is used, it may be difficult to process the edge sharply, with a possibility of the edge dulling in time of processing. According to this invention, therefore, the edge 3b of the nozzle 3 is formed of a superhard material, so that it is possible to process it to a sharper shape and give it sufficient durability. Consequently, the edge is never worn out or chipped owing to the pressure of extruding the thermoplastic resin, and the thermoplastic resin may be extruded stably and continuously for a long time. Rockwell A hardness of the superhard material for forming the nozzle 3, preferably, is 85 or higher. The superhard material may be a titanium alloy or ceramic material, for example. The surfaces of the superhard material may be plated or given nitriding treatment.

Figure 7:
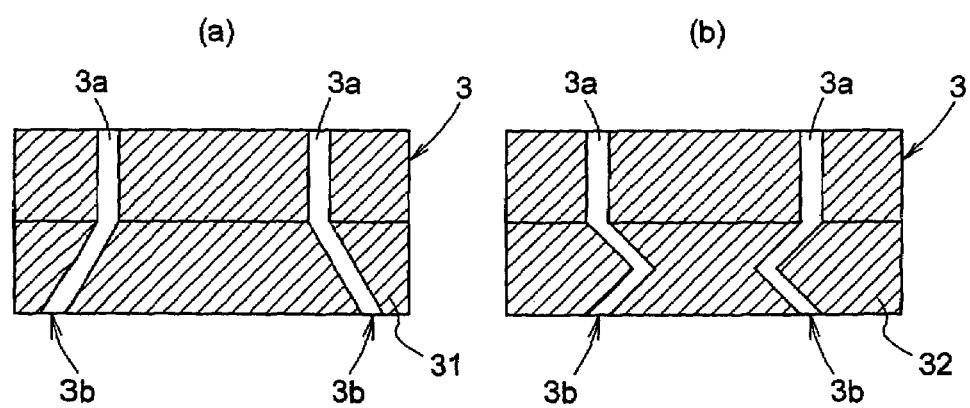
FIG. 7 is (a) a schematic view showing an example of a nozzle having a diameter enlarging nozzle, and (b) a schematic view showing and example of a nozzle having a diameter-enlarged nozzle.

When extruding the molten resin from the nozzle 3, a suitable nozzle head may be attached to the nozzle 3. Then, the molten resin is extruded from the nozzle 3 through the nozzle head. An example of nozzle head usually employed is a parallel nozzle 30 having a channel extending straight to the exit as shown in FIG. 6(b). Instead, a diameter enlarging nozzle 31 as shown in FIG. 7(a) may be used as necessary. The diameter enlarging nozzle 31 extrudes the thermoplastic resin as expanded radially, and thus the extruded thermoplastic resin has an enlarged diameter. When the thermoplastic resin is extruded from the nozzle with such diameter enlarging nozzle 31, a force may be applied to the excluded resin to enlarge the diameter thereof. Thus, it is also possible to apply an orientation circumferentially of the tubular resin film 20 formed subsequently, thereby to obtain a resin film with a greater retardation. Further, a diameter enlarged nozzle 32 as shown in FIG. 7(b) may be used in which the channel 3a has a diameter reduced once and then enlarged. With this shape, the diameter of extrusion of the thermoplastic resin may be reduced, to realize a compact construction of the entire apparatus.

Incidentally, the molten resin is forward from the barrel 1b to the nozzle 3 of the heating extruder 1 in the following two main modes. They are a spider mode that extrudes the molten resin in an ordinary way using a single channel, and a spiral mode that once branches the molten resin, for example, by four spiral-shaped channels arranged at an end of the barrel 1b, and joins again the branched molten resin. While whichever mode may be used in this invention, the latter spiral mode is preferred since the tubular resin film 20 formed subsequently has a beautiful appearance without resin flow pattern on the surface. Where a filter is disposed between the barrel 1b and nozzle 3 from of the heating extruder 1, impurities may be removed from the molten resin, to obtain a further enhanced appearance.

Figure 8:
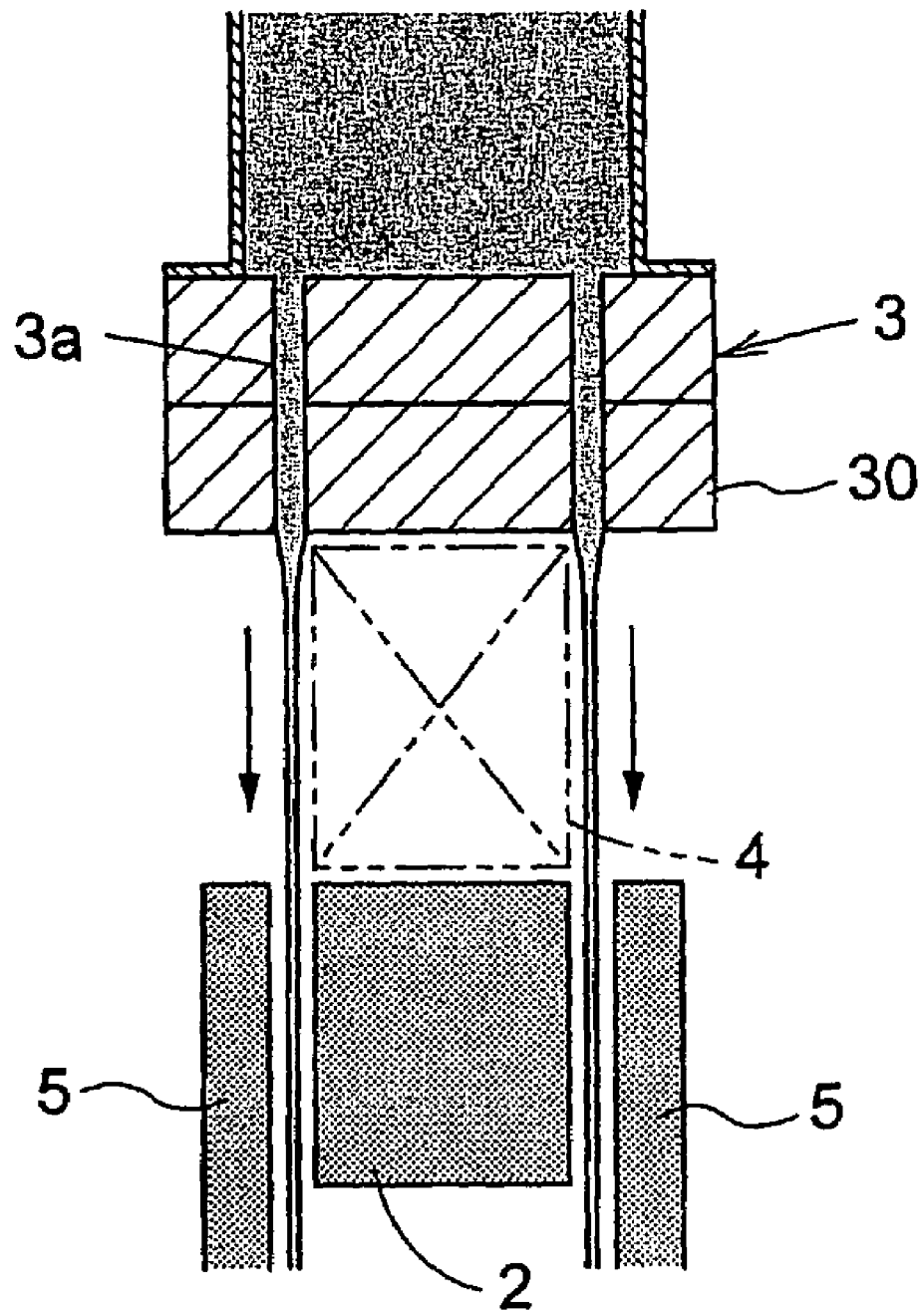
FIG. 8 is an enlarged fragmentary view of a tubular resin film manufacturing apparatus having an outside unit.

Further, the tubular resin film manufacturing apparatus 100 may include an outside unit 5 opposed to the outer surface of the thermoplastic resin extruded in the tubular form from the heating extruder 1. FIG. 8 is an enlarged fragmentary view of the tubular resin film manufacturing apparatus 100 having the outside unit 5. Where the outside unit 5 is provided for the tubular resin film manufacturing apparatus 100, this outside unit 5 cooperates with the core unit 2 to shape, from both outside and inside, the thermoplastic resin extruded in the tubular form from the nozzle 3. The tubular resin film 20 may be manufactured which is molded more accurately and excellent in smoothness. The outside unit 5 may be constructed to exude gas from part or whole of its surface. In this case, it is possible to adjust the temperature of the exuding gas. Then, the outer surface of the thermoplastic resin and the outside unit 5 may be maintained out of contact with each other. Thus, the tubular resin film formed subsequently may be free from creases, slacks, lenticulations and the like, and may have a small, uniform thickness and smooth surfaces.

The core unit 2, second core unit 4b and outside unit 5 described above may be formed of a porous material, respectively. Where each of the above members is formed of a porous material, the gas may be exuded uniformly from the entire surface of each member, with little local variations in the amount of gas exudation. Consequently, the non-contact between the thermoplastic resin and the core units is further promoted, thereby minimizing the possibility of leaving scratches and line patterns on the tubular resin film formed subsequently. This assures a high-quality film having smooth and flat surfaces. Examples of the porous material includes a metallic porous material (such as porous sintered metal), an inorganic porous material (porous ceramics), a filter material and a metal formed with numerous bores. Considering durability, maintainability, and the uniformity of gas exudation, a metal porous material is preferred and a porous sintered metal is the most desirable. Preferably, the porous material has the pore size, thickness and so on adjusted to realize a uniform gas exudation state.

Next, in connection with the tubular resin film manufacturing apparatus and manufacturing method according to this invention so far described, a mechanism and method for stretching the tubular resin film will be described in detail below, referring to FIG. 1 again. The film stretching mechanism and method described hereinafter, naturally, can use the tubular resin film manufactured by the tubular resin film manufacturing apparatus according to this invention, but can be applied also to the case of stretching a tubular resin film separately manufactured beforehand (which is not limited to what is manufactured by the tubular resin film manufacturing apparatus according to this invention).

The tubular resin film manufacturing apparatus 100 according to this invention includes a stretching section 6 for stretching the tubular resin film 20 molded by the core unit 2, and a maintaining section 7 for maintaining the shape of the stretched tubular resin film 20. A preheating section 11 may be provided at an upstream stage of the stretching section for preheating the tubular resin film 20. The preheating section 11 may be formed of a porous material as is the core unit 2, for example, and connected to the gas source not shown to exude gas flow having undergone an appropriate temperature control from the surface of the preheating section 11 to the inner surface of the tubular resin film 20. By adjusting the temperature and flow rate of the gas exuded from the preheating section 11, the tubular resin film 20 may be preheated to a variable preheat temperature. Where it is necessary to orient the tubular resin film 20, such as developing a retardation, the stretching temperature of the tubular resin film 20, preferably, is in a range of Tg to Tg+50(° C.). A more desirable temperature range is a range of Tg+10(° C.) to Tg+30(° C.). With such a range, the tubular resin film 20 may be oriented efficiently, and a retardation may be developed significantly. When the stretching temperature is lower than Tg, a strong stress must be applied to the film in order to stretch it, resulting in a possibility of breaking the film. When the stretching temperature is higher than the upper limit, the resin will become close to a molten state in most cases. Even if stretched, the molecules cannot be oriented and development of a retardation cannot be expected.

The stretching section 6 and maintaining section 7 form a most characteristic construction in this invention. In order to facilitate understanding, the stretching section 6 and maintaining section 7 will particularly be described hereinafter.

As shown in FIG. 1, the stretching section 6 includes drawing rollers 8 for stretching the tubular resin film 20 mainly in the longitudinal direction (MD stretch), and/or a diameter enlarging mandrel 9 for stretching the film mainly in the circumferential direction (TD stretch).

Figure 9:
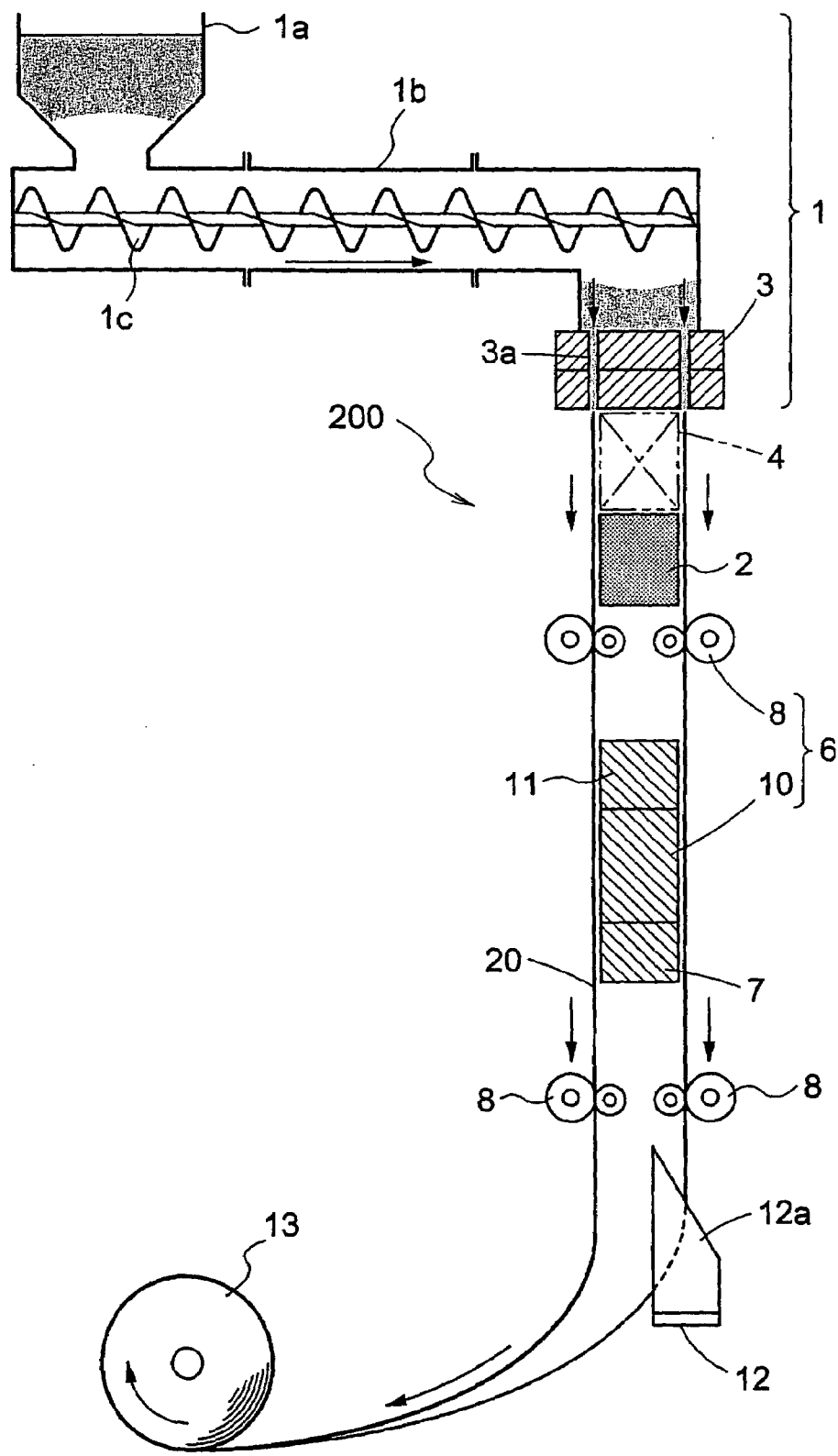
FIG. 9 is a schematic view showing a tubular resin film manufacturing apparatus which is another embodiment of this invention.

For carrying out only the MD stretch using the stretching section 6, a tubular resin film manufacturing apparatus 200 shown in FIG. 9 may be used. The tubular resin film manufacturing apparatus 200 employs a cylindrical mandrel 10 having the same sectional shape as the core unit 2, instead of the conical mandrel 9 in the tubular resin film manufacturing apparatus 100 of FIG. 1. By employing this cylindrical mandrel, a contraction in the TD direction may be suppressed in time of MD stretch. The drawing rollers 8 forming the stretching section 6 may be disposed in at least one location, but, preferably, disposed in two locations at a suitable interval along the longitudinal direction of the tubular resin film 20 as shown in FIGS. 1 and 9. Then, the MD stretch may be carried out more accurately and easily by a difference in rotating speed between the two drawing rollers 8. The drawing rollers 8 may be arranged to contact the outer surface or inner surface of the tubular resin film 20, or may be arranged on both the outer surface and inner surface of the tubular resin film 20 to pinch the tubular resin film 20 between both drawing rollers.

When the MD stretch is carried out with this construction, an orientation may be applied longitudinally of the film, thereby to manufacture a tubular resin film suitable as a retardation film to be used for liquid crystal displays (LCDs) and the like. Such a tubular resin film is free from creases, slacks, lenticulations and the like, and has a small, uniform thickness and smooth surfaces, thus realizing a high-quality resin film product with little retardation variations.

When the TD stretch is performed, as shown in FIG. 1, the tubular resin film 20 may be fitted to follow the surface of the conical mandrel 9, and the tubular resin film 20 may be downward in this state. As the tubular resin film 20 is transported, the TD stretch of the tubular resin film 20 is performed with a draw ratio determined by the outside diameter of the mandrel.

Figure 10:
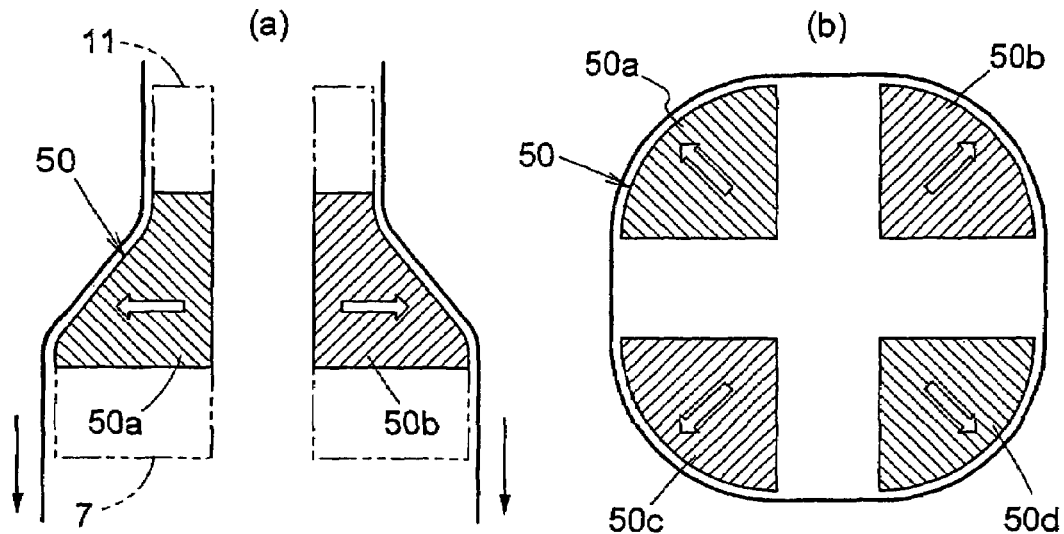
FIG. 10 is (a) a schematic view showing an example of a split type mandrel having an enlarging diameter, and (b) a bottom view thereof.

The conical mandrel 9 may be made dividable into a plurality of parts, with each part radially movable, to render the enlarged diameter of the tubular resin film variable. FIG. 10 shows an example of such a split type diameter enlarging mandrel 50. The split type diameter enlarging mandrel 50 shown in FIG. 10 has a construction dividable into four mandrel pieces (50a-50d). Each of the mandrel pieces (50a-50d) can be moved radially. The movements may be performed manually or by a mechanical device such as an electric motor. Each mandrel piece (50a-50d) can be moved not only in time of an off-line state not working on the tubular resin film, but also during a stretching process. This allows a fine adjustment of film manufacturing conditions to be made during operation. As a result, the tubular resin film of this invention can be made a high-quality resin film product. Where the split type diameter enlarging mandrel 50 described above is used, the preheating section 11 and maintaining section 7 may also be constructed to carry out similar operations in accordance with the split and movement of the split type diameter enlarging mandrel 50.

When the TD stretch is carried out with this construction, an orientation may be applied circumferentially of the film, thereby to manufacture a tubular resin film suitable as a retardation film to be used for liquid crystal displays (LCDs) and the like. Such a tubular resin film is free from creases, slacks, lenticulations and the like, and has a small, uniform thickness and smooth surfaces, thus realizing a high-quality resin film product with little retardation variations.

For performing what is called a biaxial stretch that performs the MD stretch and TD stretch simultaneously, as shown in FIG. 1, the conical mandrel 9 and drawing rollers 8 may be used simultaneously. Draw ratios of the tubular resin film 20 in the MD stretch direction and TD stretch direction may be set to desired values by selecting a rotating speed of the drawing rollers 8 and an outside diameter of the conical mandrel 9. In performing a biaxial stretch, the MD stretch and TD stretch may be performed separately from each other. For example, the MD stretch may first be carried out with the drawing rollers 8, and then the TD stretch carried out by applying the tubular resin film to the conical mandrel 9. Alternatively, the TD stretch may first be carried out by applying the tubular resin film to the conical mandrel 9, and the TD-stretched tubular resin film may be MD-stretched with the drawing roller 8.

The drawing rollers 8 forming the stretching section 6 and directly contacting the surface of the tubular resin film 20, preferably, are formed of a flexible material (e.g. silicone rubber) that does not damage the surface. It is preferable to arrange the drawing rollers 8 to contact at a plurality of equidistant points around the tubular resin film 20, so that the tubular resin film 20 may be stretched uniformly. The conical mandrel 9 and/or cylindrical mandrel 10 forming the stretching section 6, preferably, are/is formed of a porous material such as a porous sintered metal, as are the core unit 2, second core unit 4b and outside unit 5 described hereinbefore. Each mandrel may be connected to the gas source (not shown) to exude the gas at an appropriately adjusted temperature and flow rate from the surface, as necessary. Then a direct contact between the tubular resin film 20 and the mandrel is avoided to eliminate the possibility of leaving scratches and line patterns on the inner surface of the tubular resin film. This assures a high-quality film having smooth and flat surfaces. The non-contact between the tubular thermoplastic resin and the stretching section is promoted to reduce resistance in time of stretching. This provides an effect of a smooth stretching process being carried out by the stretching section.

The maintaining section 7 is provided to maintain the shape of the stretched tubular resin film 20. When the stretched tubular resin film is immediately relieved of the stretching force, the tubular resin film may contract by reaction. Without the maintaining section, the stretched and oriented film will contract in a free state, resulting in thickness variations and retardation variations. In this invention, in order to prevent such a phenomenon, the maintaining section 7 maintains and fixes the shape of the stretched tubular resin film 20 to prevent contraction and the like of the stretched film. According to this invention, therefore, the tubular resin film having passed through the maintaining section 7 is free from creases, slacks, lenticulations and the like, and has a small, uniform thickness and smooth surfaces, thus realizing a high-quality resin film product with little retardation variations.

Unless the film is cooled to a certain temperature by the time the film has passed through the maintaining section, the stretched and oriented film will contract in a hot state and free state, and is highly likely to develop thickness variations and retardation variations. In this invention, in order to prevent such a phenomenon, the maintaining section 7, preferably, is constructed to cool the tubular resin film. It is also preferable that the cooling temperature in the maintaining section and the length of the maintaining section are adjusted so that the film temperature will be a temperature not exceeding Tg by the time the film has passed through the maintaining section.

The maintaining section 7 may, for example, be formed of a porous material as is the above stretching section 6, and may be connected to the gas source (not shown) to exude the gas at an appropriately adjusted temperature and flow rate, as necessary, from the surface of the maintaining section 7 to the inner surface of the stretched tubular resin film 20.

Incidentally, in FIGS. 1 and 9, the preheating section 11, the conical mandrel 9 or cylindrical mandrel 10 forming the stretching section 6, and the maintaining section 7, are shown as arranged inside the cylindrical resin film 20. They may be arranged inside and outside the cylindrical resin film 20 to hold the cylindrical resin film 20 from both sides. In this case, the cylindrical resin film 20 is not completely exposed, and may be stretched in a state of increased stability.

The tubular resin film 20 obtained in this way has very smooth surface though small in thickness, may be given a still better orientation, and therefore can conveniently be used as a retardation film for liquid crystal displays (LCDs) and the like. Although thickness of the film used as such a retardation film may have an arbitrary value, it is desirable that the film is made as thin as possible to achieve a cost reduction or thinning of a device that uses the retardation film as a component thereof. By using the tubular resin film manufacturing apparatus according to this invention, it is possible to a high-quality resin film product free from creases, slacks, lenticulations and the like, and has a small, uniform thickness, smooth surfaces, little retardation variations, even with a thickness of 0.1 mm or less, for example.

Figure 11:
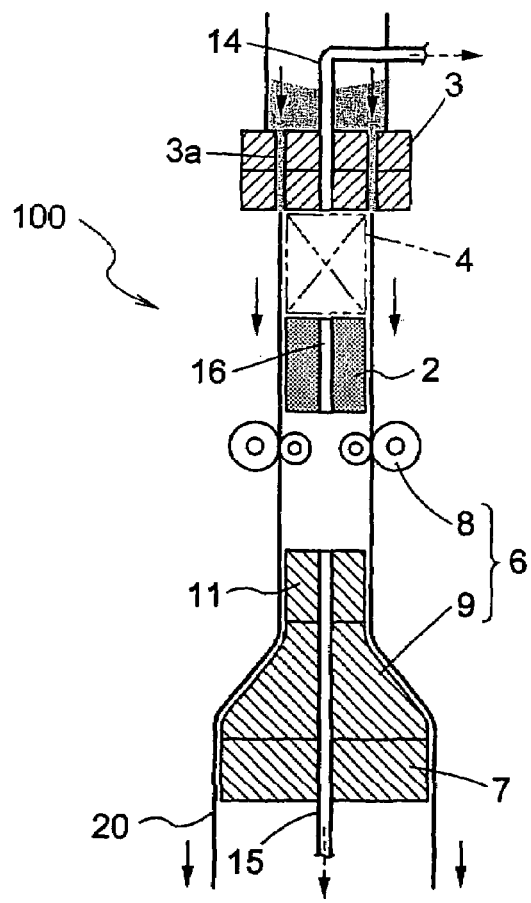
FIG. 11 shows an example of tubular resin film manufacturing apparatus according to this invention which has venting devices for placing the interior of a tubular resin film in communication with ambient air.

Incidentally, the gas exuding from the surfaces of the core unit 2, second core unit 4b, preheating section 11, stretching section 6 and maintaining section 7 could flow into the region of the stabilizing device 4 between the nozzle and core unit, thereby causing an unexpected pressure increase in the region of stabilizing device 4 or unexpectedly raising the internal pressure in the tubular resin film 20. In such a case, the thermoplastic resin is inflated outward, or repeats contraction and expansion. Such a phenomenon is not desirable since it could have an adverse effect on the surface smoothness and thickness uniformity of the film ultimately obtained. In order to preclude such a situation, it is preferable to provide a venting device for preventing an increase in the internal pressure in the tubular resin film. This provision will eliminate the possibility of the tubular resin film expanding outward or repeating contraction and expansion, to maintain good surface smoothness of the film. Thus, the tubular resin film is free from creases, slacks, lenticulations and the like, to obtain a high-quality resin film product having a small, uniform thickness and smooth surfaces. As shown in FIG. 11, for example, a venting device 14 may be provided to extend from the nozzle 3 through the heating extruder 1 for communication with ambient air, and a venting device 16 penetrating the core unit 2 and second core unit and a venting device 15 penetrating the maintaining section 7 and stretching section 6 (or preheating section 11) may be provided to place the interior of the tubular resin film 20 in communication with ambient air. These venting devices may be used independently or may be used together. An internal pressure adjusting mechanism such as an internal pressure regulating valve may be provided. However, where the venting device 14 is provided, since the gas flow out through the venting device 14, a turbulence of gas flow may occur in the region of the stabilizing device 4 between the core unit and the nozzle, which could have an adverse effect on the surface smoothness and thickness uniformity of the film ultimately obtained. Therefore, care must be taken to prevent the turbulence of gas flow from influencing the film. Where the venting device 14 is provided, for example, it is preferable to extend piping from the venting device 14 downward to a predetermined position (e.g. adjacent the upper end of the core unit 2 or second core unit 4b, or adjacent the upper end of the preheating section 11 or stretching section 9) or to install an internal pressure regulating valve or the like adjacent the venting device 14, to adjust the tube internal pressure to a predetermined pressure, thereby avoiding a turbulence of gas flow occurring in the region of the stabilizing device 4 between the nozzle and core unit 2.

Figure 12:
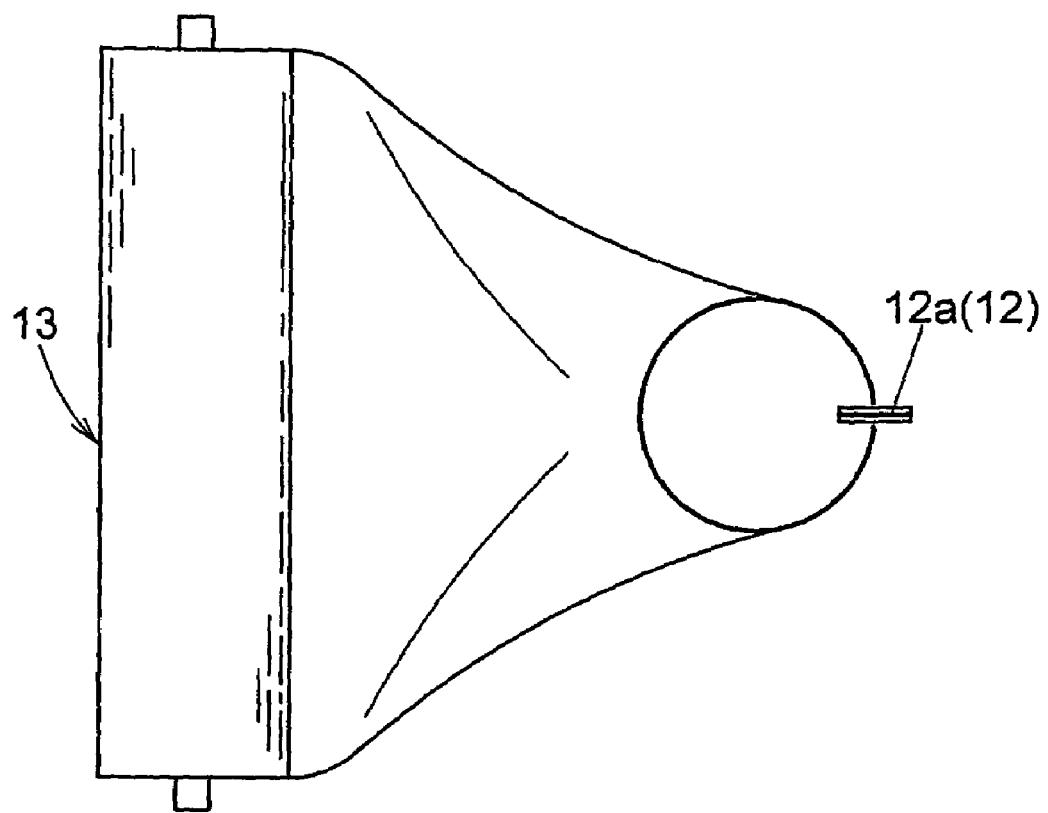
FIG. 12 is a bottom view of the tubular resin film manufacturing apparatus, showing a state of the tubular resin film being cut open by a cutting device.

The tubular resin film 20 with the shape fixed thoroughly is transported to a position of a cutting device 12 where it is cut open in the longitudinal direction to become a flat, long sheet-like film (see FIG. 1). The cutting device 12 is arranged, for example, to have a cutting portion 12a opposed to the transporting direction of the tubular resin film 20. As the tubular resin film 20 is transported downward, the cutting device 12 can cut open the tubular resin film 20. FIG. 12 is a bottom view of the tubular resin film manufacturing apparatus 100, showing a state of the tubular resin film being cut open by the cutting device 12. As seen from FIG. 12, the cutting device 12 may just be fixed to an arbitrary position intersecting the tubular resin film 20.

On the other hand, the cutting device 12 may also be constructed revolvable circumferentially of the tubular resin film 20. In this case, where the cutting portion 12a has its direction changeable with revolution of the cutting device 12, it can cut the tubular resin film 20 to a spiral shape in cooperation with the downward transport of the tubular resin film 20. Further, a spiral cut of desired pitch can be performed by appropriately adjusting the transport speed of the tubular resin film 20 and revolving speed of the cutting device 12. Where a laser cutter is used as the cutting device 12, a laser emitting direction may be changed by changing, by remote control or otherwise, the direction of a prism through which the laser passes. Thus, without moving the laser cutter directly, a spiral cut of the tubular resin film 20 may be performed easily. The laser cutter may be installed in any selected location regardless of the transport direction of the tubular resin film 20, which greatly improves the degree of freedom of apparatus design. With such a laser cutter, not only a spiral cut but a still more complicated cut can also be performed, to increase application of the resin film greatly. While the method of revolving the cutting device 12 circumferentially of the tubular resin film 20 has been described above, a similar film cut to a spiral shape can be obtained also by rotating a portion including the nozzle, with the cutting device 12 fixed. With such a construction, there is no need to revolve a winding device described hereinafter, to achieve space-saving.

Figure 13:
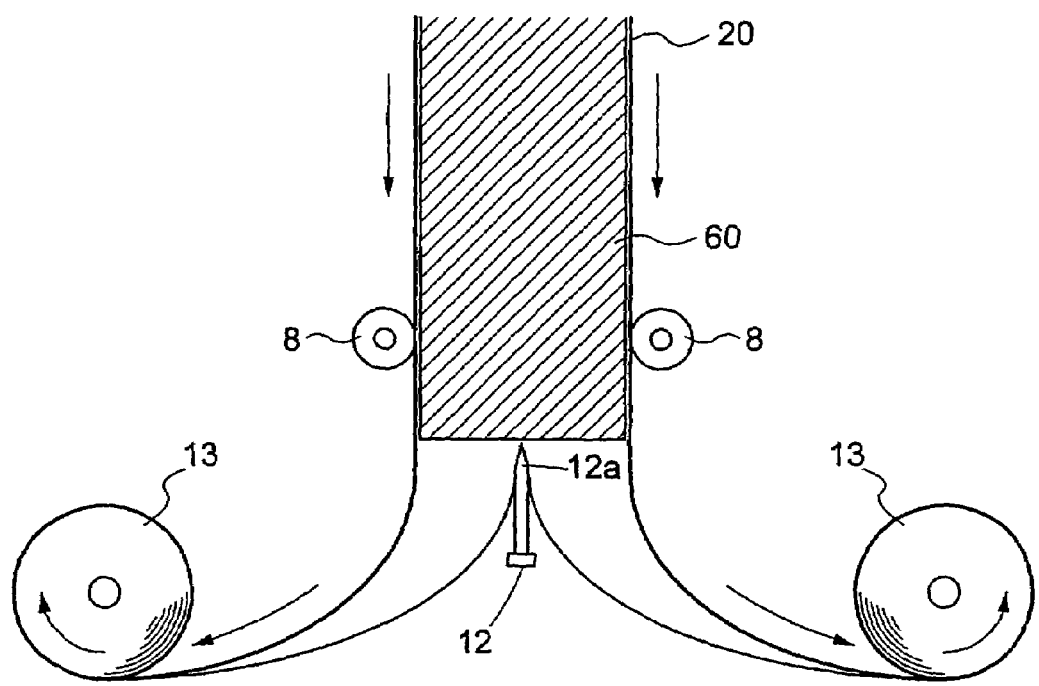
FIG. 13 is (a) a schematic view showing part of a tubular resin film manufacturing apparatus according to this invention having two cutting devices, and (b) a bottom view thereof.
Figure 13:
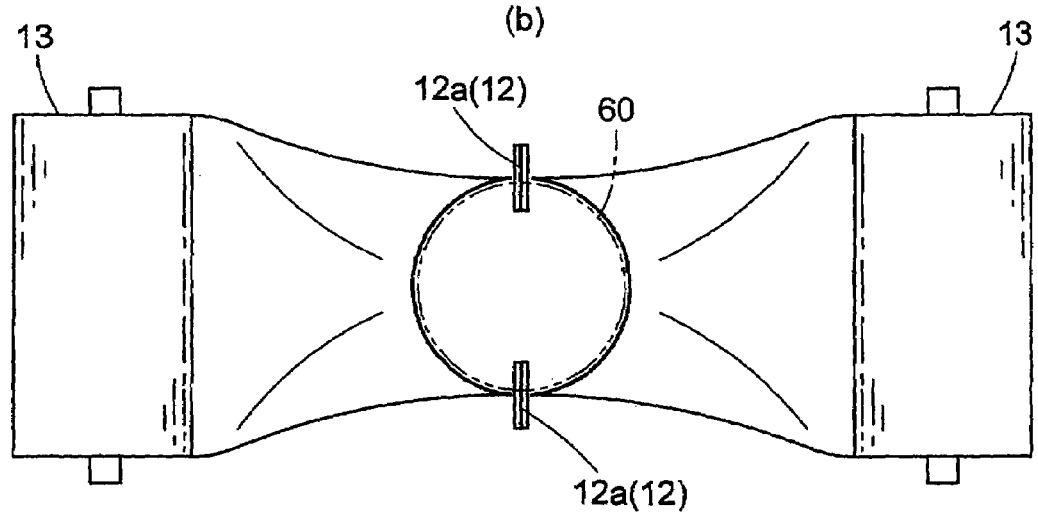

In this specification, the mode having only one cutting device 12 provided for the tubular resin film 20 has so far been described. This invention is not limited to such a mode. As shown in FIG. 13, for example, two cutting devices 12 may be provided to obtain a plurality of sheet-like films at a time. FIG. 13(a) is a schematic view showing part of a tubular resin film manufacturing apparatus having the two cutting devices 12, and (b) is a bottom view of the tubular resin film manufacturing apparatus in (a). In time of cutting, an insert unit 60 having substantially the same outside diameter as the inside diameter of the tubular resin film 20 may be placed inside the tubular resin film 20 in advance. Since such an insert unit stabilizes behavior in time of transport of the tubular resin film 20, a deviation of the cutting device 12 is reduced to cut the tubular resin film 20 with increased accuracy and stability. Where this insert unit 60 is formed of a porous material and connected to the gas supply source, not shown, to exude the gas from the surface of the insert unit 60, the insert unit and the inner surface of the tubular resin film 20 may be maintained out of contact with each other, to reduce the possibility of damage, which is desirable.

In this invention, the tubular resin film 20 is cut in the longitudinal direction into a sheet-like film. Two sheet-like films may be obtained, of course, by a conventional method, that is a method of folding the tubular resin film 20 and cutting off the opposite ends.

The long sheet-like film formed by the cutting action of the cutting device 12 is ultimately taken up by a winding device 13 (see FIG. 1 or 13). The winding device 13 needs to be interlocked to the above cutting device 12 so that the film is not twisted in time of take-up. That is, where the cutting device 12 is fixed, the winding device 13 is also fixed. Where the cutting device 12 makes a revolving movement, the winding device 13 must also make a revolving movement accordingly. Where the winding device 13 and cutting device 12 are integrated, the cut tubular resin film 20 is taken up as it is, thus capable of coping with any one of the above cases. An elongated paper tube may be cited as an example of the part of the winding device 13.

The sheet-like film obtained from the tubular resin film of this invention produced as described above can be given an excellent orientation, and may therefore conveniently be used as a retardation film. The retardation film is used in liquid crystal display device using TN, VA, or STN mode, in order to improve lowering of the viewing angle by birefringence of the liquid crystal. Generally, the retardation film will cause an irregular color of the liquid crystal display when variations in the slow axis angle exceed ±3 degrees. The sheet-like film obtained by this invention has variations in the slow axis angle within ±3 degrees in the width direction, which indicates excellent display quality.

A retardation film manufactured by stretching of the conventional tentering mode, only the film central part could be used because of large variations in the slow axis angle in end regions. According to this invention, since the resin film is stretched while maintaining the tubular form, the entire width of the film may be used. For this reason, yield is improved, and manufacturing cost may be reduced substantially.

Examples of the thermoplastic resin usable in this invention include polyethylene, polypropylene, polystyrene, polycarbonate, polyester, polyarylate, polyamide, cyclic polyolefin, ethylene vinyl alcohol copolymer, and polyethersulfone. These resins may be used alone, or a polymer blend or copolymer containing two or more of these may be used. Or derivatives or conversions of these resins may be used.

Where the thermoplastic resin film obtained from the tubular resin film of this invention is used as a retardation film for the above liquid crystal displays (LCDs) or the like in particular, it is preferable to select, as the resin material, a material that can secure high dimensional stability (e.g. thickness uniformity) and optical stability (e.g. retardation uniformity) without being influenced by heat and/or moisture, a material that has a high glass transition temperature (Tg) (e.g. 120° C. or higher) to withstand heat from the backlight of the liquid crystal display, or a material excellent in visible light transmittance to provide an excellent liquid crystal display. The thermoplastic resin film may be unstretched, or may be uniaxially or biaxially stretched. The thermoplastic resin film may be oriented by coating it with a discotic liquid crystal polymer or nematic liquid crystal polymer.

The retardation film is required to have long-term stability. To meet this, it is preferred that the absolute value of the photoelastic coefficient of the film does not exceed $1.0 \times 10^{-11}$ $Pa^{-1}$. It is particularly preferable to use, as a thermoplastic resin that satisfies such a characteristic, a norbornene polymer which is cyclic polyolefin. The norbornene includes a homopolymer consisting of a norbornene monomer or its hydrogenation, and a copolymer of a norbornene monomer and a vinyl compound or its hydrogenation. Specific products include "Arton" (made by JSR), "ZEONOR" and "ZEONEX" (made by Nippon Zeon Co., Ltd.), "APEL" (made by Mitsui Chemicals, Inc.) and "Topas" (made by Ticona).

The thermoplastic resin may have a small amount of additive such as antioxidant, lubricant, colorant, dye, pigment, inorganic filler and/or coupling agent added thereto in a range that does not affect the physical properties (glass transition temperature, light transmittance and so on).

Examples of antioxidant include a phenolic antioxidant, phosphoric acid antioxidant, sulfuric antioxidant, lactonic antioxidant, and hindered aminic light stabilizer (HALS). For a resin such as cyclic polyolefin, a phenolic antioxidant may be used suitably, taking thermal stability and compatibility into consideration. Examples of phenolic antioxidant include pentaerythritol tetrakis [3-(3,5-di-t-butyl-4-hydroxy phenyl) propionate] (e.g. trade name "IRGANOX 1010" (made by Ciba Specialty Chemicals)), Octadecyl-3-(3,5-di-t-butyl-4-hydroxy phenyl)propionate (e.g. trade name "IRGANOX 1076" (made by Ciba Specialty Chemicals)), 3,3',3'',5,5',5''-hexa-t-butyl-a,a',a''-(mesitylene 2,4,6,-trier)tri-p-cresol (e.g. trade name "IRGANOX 1330" (made by Ciba Specialty Chemicals)), 1,3,5-tris(3,5-di-t-butyl-4-hydroxybenzyl)-1,3,5-triazine-2,4,6(1H,3H, 5H)-trione (e.g. trade name "IRGANOX 3114" (made by Ciba Specialty Chemicals)), and 3,9-bis{2-[3-(3-t-butyl-4-hydroxy 5-methyl phenyl)propionyloxy]-1,1-dimethyl ethyl}-2,4,8,10-tetra-oxaspiro [5, 5] undecane (e.g. trade name "Adekastab AO-80" (made by Asahi Denka Kogyo K.K.)). The content in the thermoplastic resin of the antioxidant, preferably, is adjusted to a range of 0.01 to 5% by weight. The content exceeding 5% by weight will impair light transmittance and mechanical strength of the film, and that less than 0.01% by weight will fail to secure a sufficient antioxidant effect, which is not desirable.

Examples of lubricant include a lubricant of fatty acid amide series, a lubricant of the nonionic surface active agent type, a hydrocarbon lubricant, a fatty acid lubricant, an ester lubricant, an alcoholic lubricant, a fatty acid metal salt lubricant (metal soap), a montanic acid ester partial saponification, and a silicone lubricant. For a resin such as cyclic polyolefin, a lubricant of fatty acid amide series may be use suitably, taking thermal stability and compatibility into consideration. Examples of lubricant of fatty acid amide series include stearic acid amide (e.g. "DIAMID 200" (made by Nippon Kasei Chemical Co., Ltd.)), methylene bis stearic acid amide (e.g. trade name "BISAMID LA" (made by Nippon Kasei Chemical Co., Ltd.)), m-xylylene bis stearic acid amide (e.g. trade name "SLIPAX PXS" (made by Nippon Kasei Chemical Co., Ltd.)), ethylene bis stearic acid amide (e.g. trade name "Kao Wax EB" (made by Kao Corp.), and ARMO WAX EBS (made by Lion Akzo Co., Ltd.). The content in the thermoplastic resin of the lubricant, preferably, is in a range of 0.01 to 10% by weight, and most preferably 0.05 to 1% by weight. The content less than 0.01% by weight will hardly produce effects of reducing extruding torque, or preventing scratches inflicted on the film. The content exceeding 10% by weight will increase the chance of slippage with the extruder screw, which makes a uniform feeding of the resin impossible and a stable manufacture of the film difficult. Further, the amount of bleed-out increases with time, causing poor appearance of the film and poor adhesion.

The above phenolic antioxidants, lubricants and the like may be used alone or may be used in combination of two or more of these.

Methods of adding the additives such as antioxidant and lubricant to the thermoplastic resin include a method in which pellets of the thermoplastic resin and a predetermined quantity of powder of the additives are mixed, and heat-melted by a heating extruder, a method in which the thermoplastic resin and additives are dissolved in an organic solvent which is then separated, a method in which a masterbatch of the thermoplastic resin and additives is prepared beforehand, and a method in which the above masterbatch is mixed with the same type or a different type of resin as/to the resin used in preparing the masterbatch. Regarding the above antioxidant and lubricant, similar effects may be produced also by a method in which the channel inside the heating extruder (especially near the nozzle) is coated with these additives, or a method in which the additives are supplies at a fixed rate from the hopper or an intermediate position of the channel.

While a preferred embodiment of this invention has been described hereinbefore, further specific embodiments will be shown and described to promote understanding of this invention. In the embodiments to be described hereinafter, as common to the embodiments, various characteristics of the tubular resin film manufacturing apparatus and tubular resin film were measured as follows:

(1) Temperature of the Tubular Resin Film Manufacturing Apparatus

The type K thermocouple (AM-7002) made by Anritsu Meter Co., Ltd. was used. Measurements were taken by applying type K thermocouple to predetermined parts of the tubular resin film manufacturing apparatus.

(2) Amount of Gas Exudation

It was measured by using FLOLINE SEF-52 made by STEC INC.

(3) Film Temperature

THERMLET T3P made by Rayteck Japan, Inc. was used to measure the film temperature of the film flowing continuously.

(4) Film Thickness

A film inspector (TS-0600AS2) made by TES was used. First, in the TD direction, film thickness was measured for the full film width at intervals of 1 mm. Subsequently, this measurement was repeated 200 times in the MD direction. An average is calculated from all data, and thickness variations relative thereto were expressed in %.

(5) Film Retardation and Slow Axis

KOBRA-21ADH made by Oji Scientific Instruments was used. First, in the TD direction, film retardation and slow axis were measured for the full film width at intervals of 20 mm. Subsequently, this measurement was repeated 50 times in the MD direction. An average is calculated from all data, and phase variations relative thereto were expressed in %. For slow axis variations, a range of all data dispersion was determined and expressed in ° (degrees).

EMBODIMENT 1

For example, an apparatus similar to the apparatus of FIG. 1 was used to produce a stretched tubular resin film in accordance with this invention. In this embodiment, ZEONOR 1420R (Tg=136° C.; made by Nippon Zeon Co., Ltd.) was used as film raw material. Film producing conditions are shown below.

[Heating Extruder]

A heating extruder of the spiral mode having a mesh type filter (mesh size: 10 μm) was used.
 barrel diameter: 50 mm
 screw shape: full flight uxiaxial type
 L/D: 25

[Nozzle]

A nozzle having a parallel nozzle was used.
 bore diameter: 300 mm
 corner radius: 10 μm
 material: superhard material (Rockwell A hardness=91)
 Temperature: 230° C.

[Stabilizing Device]

A metal cylinder was provided in the tube interior of the resin to act as the stabilizing device.
 clearance: 20 mm

[Core Unit]

A metallic porous material having a 35 μm average pore size was used.
 length of the core unit: 50 mm
 outside diameter of the core unit: 296 mm
 amount of gas exudation: 7 L/min.

[Preheating Section]

A preheating section formed of a porous material was provided inside and outside the tubular resin film.
 Preheating section temperature: 155° C. (inside and outside)
 final film temperature in the preheating section: 155° C.
 amount of gas exudation: adjusted to an extent of doing no damage the film.
 length of the preheating section: adjusted to a length capable of maintaining the above final film temperature.

[Stretching Section]

A diameter enlarging mandrel formed of a porous material with a vertical diameter ratio of 1:1.4, and multipoint drawing rollers with a vertical velocity ratio of 1:1.2 were used. In time of stretching, MD stretch and TD stretch were performed simultaneously while temperature control was carried out from inside and outside the film.
 stretching section temperature: 155° C. (inside and outside)
 amount of gas exudation: adjusted to the extent of doing no damage the film.
 length of the stretching section: adjusted to a length capable of maintaining the 155° C. film temperature.

[Maintaining Section]

A maintaining section formed of a porous material and having the same diameter as the lower end of the above diameter enlarging mandrel was provided inside the tubular resin film.
 maintaining section temperature: 100° C. (the outside being at room temperature)
 amount of gas exudation: adjusted to the extent of doing no damage the film.
 length of the maintaining section: adjusted to a length for the film temperature to falls to or below Tg of the raw material resin.

[Venting Device]

As shown in FIG. 11, the venting device 15 was provided to extend through the preheating section, the diameter enlarging mandrel forming the stretching section, and the maintaining section.

The tubular resin film obtained as described above was cut open with two cutters as shown in FIG. 13, and two sheet-like films with a width of about 650 mm were taken up. The sheet-like films had excellent outward appearance, with thickness variations and retardation variations both at ±2% or less, slow axis variations also at ±2 degrees or less.

EMBODIMENT 2

This embodiment shows an example using a film raw material and a stabilizing device different from those in the above Embodiment 1.

For example, an apparatus similar to the apparatus shown in FIG. 11 was used to produce a stretched tubular resin film in accordance with this invention. In this embodiment, Topas 6013 (Tg=130° C.; made by Ticona) blended with 0.2% by weight of ARMO WAX EBS (made by Lion Akzo Co., Ltd.) acting as lubricant was used as the film raw material.

The film producing conditions in this embodiment are the same as the conditions in the above Embodiment 1 except for the following points.

[Stabilizing Device]

A second core unit formed of a porous material was provided in the tube interior of the resin.

[Preheating Section]

Preheating section temperature and final film temperature in the preheating section were set to 150° C.

[Stretching Section]

MD stretch and TD stretch were performed separately while carrying out temperature control from inside and outside the film.

Stretching section temperature was set to 150° C. both inside and outside. The length of the stretching section was adjusted to a length capable of maintaining the film temperature at 150° C.

[Maintaining Section]

A maintaining section formed of a porous material having a diameter 2 mm smaller than that at the lower end of the above diameter enlarging mandrel was provided inside the tubular resin film.

[Venting Device]

As shown in FIG. 11, the venting device 14 was provided to extend from the nozzle 3 through the heating extruder 1, and so was the venting device 15 to extend through the preheating section, the diameter enlarging mandrel forming the stretching section, and the maintaining section.

The tubular resin film obtained as described above was cut open with one cutter as shown in FIG. 12, and one sheet-like film with a width of about 1300 mm was taken up. The sheet-like film had excellent outward appearance, with thickness variations and retardation variations both at ±2% or less, slow axis variations also at ±2 degrees or less.

EMBODIMENT 3

This embodiment also shows an example using a film raw material and a stabilizing device different from those in the above Embodiment 1.

Figure 4:
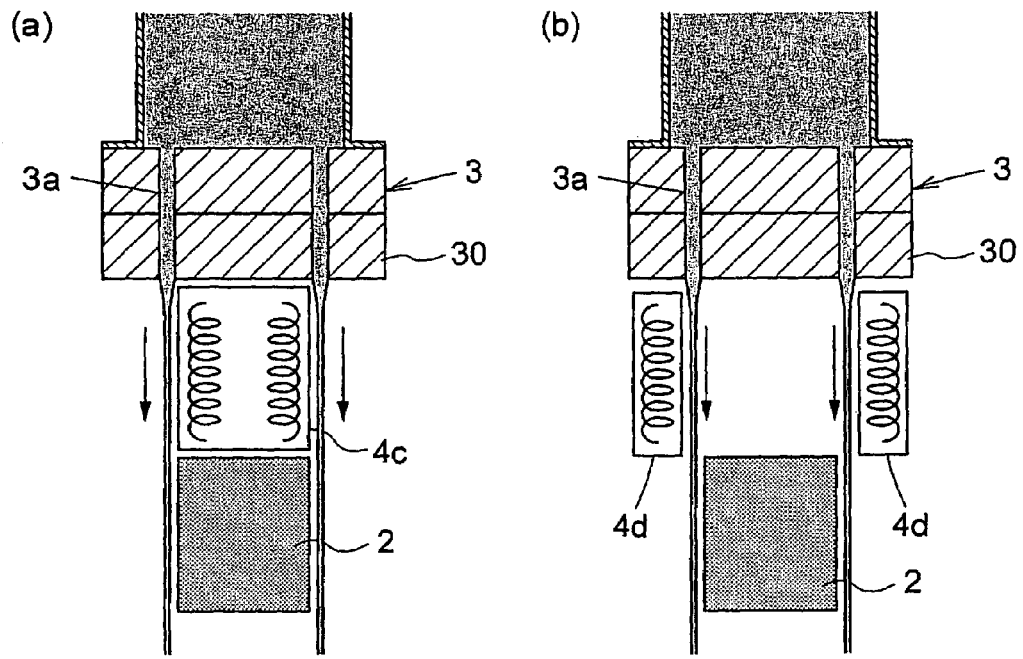
FIGS. 4(a) and (b) are two schematic views showing two examples of construction in which the stabilizing device is in the form of a temperature control mechanism.

Here, for example, an apparatus similar to the apparatus shown in FIG. 4 was used to produce a stretched tubular resin film in accordance with this invention. In this embodiment, APEL 6013T (Tg=125° C.; made by Mitsui Chemicals, Inc.) blended with 0.5% by weight of IRGANOX 1010 (made by Ciba Specialty Chemicals) acting as antioxidant was used as the film raw material.

The film producing conditions in this embodiment also are the same as the conditions in the above Embodiment 1 except for the following points.

[Stabilizing Device]

Temperature control heaters were provided in the tube interior and tube exterior of the resin to act as the stabilizing device. The temperature control heaters temperature-adjusted to an extent that thickness variations do not occur to the thermoplastic resin extruded in the tubular form.

[Preheating Section]

Preheating section temperature: 145° C. (inside and outside)

final film temperature in the preheating section: 145° C.

[Stretching Section]

MD stretch and TD stretch were performed separately while carrying out temperature control from inside and outside the film.

stretching section temperature: 145° C. (inside and outside)

length of the stretching section: adjusted to a length capable of maintaining the 145° C. film temperature

[Venting Device]

As shown in FIG. 11, the venting device 14 was provided to extend from the nozzle 3 through the heating extruder 1. A pipe extends from the venting device 14 to an area above the preheating section upper, so that the gas exuding from the preheating section, stretching section and maintaining section escapes directly through the venting device 14 without influencing the region of the stabilizing device 4.

The tubular resin film obtained as described above was cut open with two cutters as shown in FIG. 13, and two sheet-like films with a width of about 650 mm were taken up. The sheet-like films had excellent outward appearance, with thickness variations and retardation variations both at ±2% or less, slow axis variations also at ±2 degrees or less.

EMBODIMENT 4

This embodiment shows an example of making a film by using a split type diameter enlarging mandrel as shown in FIG. 10.

In this embodiment, as in the above Embodiment 1, ZEONOR 1420R (Tg=136° C.; made by Nippon Zeon Co., Ltd.) was used as film raw material. The film producing conditions in this embodiment also are the same as the conditions in the above Embodiment 1 except for the following points.

[Stretching Section]

A split type diameter enlarging mandrel, as shown in FIG. 10, which is formed of a porous material with a vertical diameter ratio of 1:1.4, and multipoint drawing rollers with a vertical velocity ratio of 1:1.2, were used. The split type diameter enlarging mandrel was divided and expanded so that the draw ratio in the radial direction increases to 1.5 times. In time of stretching, MD stretch and TD stretch were performed simultaneously while temperature control was carried out from inside and outside the film.

[Maintaining Section]

A maintaining section formed of a porous material and having the same diameter as the lower end of the above split type diameter enlarging mandrel was provided inside the tubular resin film. A maintaining section formed of a different type of porous material is provided outside.

The tubular resin film obtained as described above was cut open with two cutters as shown in FIG. 13, and two sheet-like films with a width of about 650 mm were taken up. The sheet-like films had excellent outward appearance, with thickness variations and retardation variations both at ±2% or less, slow axis variations also at ±2 degrees or less.

EMBODIMENT 5

This embodiment shows an example of longitudinally stretching the film using the film manufacturing apparatus shown in FIG. 9.

Cyclic polyolefin with Tg=163° C. (ZEONOR 1600: made by Nippon Zeon) as thermoplastic resin was melted and extruded at 240° C. resin temperature from an extruder (barrel diameter: 50 mm; and screw shape: full flight uniaxial, L/D=25), and was introduced into a die having a ring-shaped nozzle with a nozzle bore diameter of 300 mm and a nozzle gap of 1.0 mm. The number of extruder rotations and the die nozzle gap were adjusted to fix a resin discharge circumferentially.

The molten resin film discharged from the die was cooled to 180° C. by air flowing at 25° C. and at a flow rate of 50 L/min. from an air cooling device (core unit and outside unit) having a 1 mm gap and installed inside and outside the cylindrical film in a position at a 20 mm distance from the die nozzle, and was then led to a four-point support type first drawing device having movable rolls inside the film, and speed-adjustable rolls outside the film, to be drawn at a rate of 5 m/min.

Subsequently, the cylindrical film was reheated in a heating furnace (preheating section) having an atmospheric temperature adjusted to 175° C., and was drawn at a speed difference of 1.3 times by a second drawing device having the same function as the first drawing device, to be stretched to be 1.3 times in the longitudinal direction. Here, the interior is formed of a stretching section and maintaining section using a porous material.

Then, the film was cut open by a cutter disposed outside the film and parallel to the direction of flow, and thereafter was opened to a planar shape along a transport guide made to cause no crease.

The planar film obtained was wound on a paper tube whose width was 600 mm. Two planar films having a thickness of 0.1 mm were obtained.

The thickness of the films obtained was measured with a micrometer every 10 mm in the width direction, which showed a good result that thickness accuracy in the width direction was ±2 μm. When the retardation was measured, it showed a retardation film with a in-plane regardation having a value of 100 nm. When measurements were taken in detail by using a film inspector, for example, thickness variations and retardation variations were both ±2% or less. Slow axis variations were ±2 degrees or less. At this time, the slow axis of the retardation of the film had an angle parallel to the longitudinal direction of the film.

EMBODIMENT 6

Here, an example is shown in which the film is stretched circumferentially by using the device shown in FIG. 10.

In this embodiment, the stretching method is different, compared with the producing conditions in the above Embodiment 5.

Specifically, the cylinder film drawn by a drawing device similar to the four-point support type first drawing device in the above Embodiment 5 is reheated in a heating furnace (preheating section) having an atmospheric temperature adjusted to 175° C. The film is then led to an inner mandrel disposed inside the film and divided circumferentially into four parts as shown in FIG. 10, and having air outlets formed in outer walls thereof, to be stretched circumferentially by hot air at 175° C. blow from inside, and a mechanical, radial expansion by 1.3 times of the mandrel body. At this time, the film is drawn at the rate of 5 m/min. by the second drawing device disposed downstream of the cutter.

Subsequently, the film is cut open by the cutter disposed outside the film and parallel to the direction of flow, and thereafter is opened to a planar shape along the transport guide made to cause no crease. The planar film obtained was wound on two paper tubes. Two planar films having a thickness of 0.1 mm were obtained.

The thickness of the films obtained was measured with a micrometer every 10 mm in the width direction, which showed a good result that thickness accuracy in the width direction was ±2 μm. When the retardation was measured, it showed a retardation film with a thickness retardation having a value of 100 nm. When measurements were taken in detail by using a film inspector, for example, thickness variations and retardation variations were both ±2% or less. Slow axis variations were ±2 degrees or less. At this time, the slow axis of the retardation of the film had an angle of 90 degrees to the longitudinal direction of the film.

EMBODIMENT 7

Here, an example is shown in which the film is stretched both longitudinally and circumferentially by using the apparatus shown in FIG. 11.

Specifically, the cylinder film drawn by a drawing device similar to the four-point support type first drawing device in the above Embodiment 5 is reheated in a heating furnace (preheating section) having an atmospheric temperature adjusted to 175° C. The film is then led to the inner mandrel disposed inside the film and divided circumferentially into four parts, and having air outlets formed in outer walls thereof, to be stretched circumferentially by hot air at 175° C. blow from inside, and a mechanical, radial expansion by 1.3 times of the mandrel body.

The cylindrical film is drawn at a speed difference of 1.3 times by the second drawing device having the same function as the first drawing device, to be stretched to be 1.3 times in the longitudinal direction.

Subsequently, the film is cut as in Embodiment 5, to obtain two planar films having a thickness of 0.1 mm.

The thickness of the films obtained was measured with a micrometer every 10 mm in the width direction, which showed a good result that thickness accuracy in the width direction was ±2 μm. When the retardation was measured, it showed a retardation film with an in-plane retardation and a retardation in the thickness direction both having a value of 100 nm. When measurements were taken in detail by using a film inspector, for example, thickness variations and retardation variations were both ±2% or less. Slow axis variations were ±2 degrees or less.

INDUSTRIAL UTILITY

The manufacturing apparatus and manufacturing method for tubular resin films according to this invention can be used for variety purposes, and can be used, for example, as a manufacturing apparatus and manufacturing method for retardation film, shrink film and laminate film.

The invention claimed is:

1. A tubular resin film manufacturing apparatus comprising:
   a stretching section including a mandrel formed of a porous material for exuding gas from inside toward a surface of a tubular resin film so as to stretch said tubular resin film;
   a maintaining section including a mandrel formed of a porous material for exuding gas from inside toward a surface of the tubular resin film so as to maintain a shape of said tubular resin film stretched;
   a plurality of rollers arranged around a circumferential direction of the tubular resin film on an inner surface and an outer surface, respectively, downstream of the maintaining section to pinch the tubular resin between inner rollers and outer rollers for transporting the film;
   the inner rollers and the outer rollers cooperating to transport the stretched tubular resin film downstream of the maintaining section while maintaining the tubular shape of the film and
   a plurality of rollers arranged along the circumferential direction of the tubular resin film on the inner surface and the outer surface, respectively, of the tubular resin film upstream of the downstream rollers for transporting the film,
   wherein said downstream rollers are rotated at a speed faster than the upstream rollers to stretch the resin film in a longitudinal directional.

2. A tubular resin film manufacturing apparatus as defined in claim 1, wherein said stretching section is arranged to apply a stretching force to said tubular resin film for longitudinally stretching said tubular resin film.

3. A tubular resin film manufacturing apparatus as defined in claim 1, wherein said stretching section is arranged to apply a stretching force to said tubular resin film for circumferentially stretching said tubular resin film.

4. A tubular resin film manufacturing apparatus as defined in claim 1, wherein the mandrel of said stretching section comprises a split diameter enlarging mandrel dividable into a plurality of parts, each of said parts being radially movable.

5. A tubular resin film manufacturing apparatus as defined in claim 1, wherein said maintaining section is arranged to cool the tubular resin film.

6. A tubular resin film manufacturing apparatus as defined in claim 1, including a venting device for preventing an increase of a tube internal pressure of said tubular resin film.

7. A tubular resin film manufacturing apparatus as defined in claim 1, comprising a preheating section for preheating said tubular resin film before being stretched.

8. A tubular resin film manufacturing apparatus as defined in claim 1, wherein the stretching section further includes an outside unit positioned outside the tubular resin film in addition to the mandrel, said mandrel and said outside unit being arranged inside and outside the tubular resin film in order to hold the resin film from both sides so as to stretch the tubular resin film, wherein both of said mandrel and said outside unit are made of a porous material.

9. A tubular resin film manufacturing apparatus as defined in claim 1, wherein the maintaining section further includes an outside unit positioned outside the tubular resin film in addition to the mandrel, said mandrel and said outside unit being arranged inside and outside the tubular resin film in order to hold the resin film from both sides so as to maintain the shape of the tubular resin film, wherein both of said mandrel and said outside unit are made of a porous material.

10. A tubular resin film manufacturing apparatus as defined in claim 6, wherein the venting device extends through the stretching section and the maintaining section for allowing communication between upstream of the stretching section and downstream of the maintaining section.

11. A tubular resin film manufacturing apparatus as defined in claim 6, further comprising a preheating section for preheating the tubular resin film prior to being stretched, wherein the venting device extends through the preheating section, stretching section and maintaining section for allowing communication between upstream of the preheating section and downstream of the maintaining section.

12. A tubular resin film manufacturing apparatus as defined in claim 1, wherein the rollers are arranged around the circumferential direction of the tubular resin film at substantially equidistant points.

13. A tubular resin film manufacturing apparatus as define in claim 1, wherein a contacting portion between the rollers and the tubular resin film is made of silicone rubber.

* * * * *